United States Patent
Solis Cortes et al.

[11] Patent Number: 5,254,234
[45] Date of Patent: Oct. 19, 1993

[54] ELECTROLYTIC CELL FOR TREATMENT OF LIQUIDS

[76] Inventors: Gustavo A. Solis Cortes, Nahoas #70 Fracc Coronitas; Pablo D. Rivera Gonzalez, Calle Agaues #119 Frac. Las Fincas, both of Ensenada, Mexico

[21] Appl. No.: 917,702

[22] Filed: Jul. 21, 1992

Related U.S. Application Data

[63] Continuation-in-part of Ser. No. 722,089, Jun. 27, 1991, abandoned.

[51] Int. Cl.[5] ............... C25B 9/04; C25B 11/12; C25B 15/08
[52] U.S. Cl. .................... 204/275; 204/279; 204/294
[58] Field of Search ............ 204/149, 275–278, 204/294, 242, 267, 268, 269

[56] References Cited

U.S. PATENT DOCUMENTS

| | | | |
|---|---|---|---|
| 535,267 | 3/1895 | Wagner et al. | 204/275 |
| 2,111,206 | 3/1938 | Coe | 204/278 X |
| 2,571,247 | 10/1951 | Huebotter | 204/180 |
| 2,997,430 | 8/1961 | Föyn | 204/151 |
| 3,458,415 | 7/1969 | Hughes, Jr. et al. | 204/149 |
| 3,925,638 | 12/1975 | Scatoloni | 204/149 X |
| 4,119,518 | 10/1978 | Miller | 204/263 |
| 4,140,616 | 2/1979 | Wheatley et al. | 204/269 X |
| 4,169,035 | 9/1979 | Stummer et al. | 204/260 |

*Primary Examiner*—Donald R. Valentine
*Attorney, Agent, or Firm*—Lyon & Lyon

[57] ABSTRACT

An electrolytic cell for treatment and purification or vaporization of liquids. Carbon electrodes form a treatment chamber through which the liquid to be treated is passed. The carbon electrodes contain electrical distributors made of, for example, copper, which run the length of each carbon electrode. Tap water or other regular drinking water supplies can be readily treated or purified using the disclosed electrolytic cell.

4 Claims, 1 Drawing Sheet

ELECTROLYTIC CELL FOR TREATMENT OF LIQUIDS

This application is a continuation-in-part of application Ser. No. 722,089 filed on Jun. 27, 1991.

BACKGROUND OF THE INVENTION

The field of the present invention is electrolytic cells and their use for treatment of liquids.

In many places, the tap or drinking water supply is contaminated with bacteria or microorganisms from sewage or other sources. This contamination makes the water unsafe or undesirable for many uses, including use in food processing plants, as drinking water, or for other general home or business uses where it is desired to have water having a low, or no, microorganism content. Discrete quantities of purified water can be obtained, for example, as bottled water. However, it would be desirable to have a portable and economical device that could be easily used to purify usual sources of drinking or tap water. Therefore, there is a need for a simple, small appliance-like device which can operate on readily available electrical supplies such as standard household current, can utilize readily available sources of drinking or tap water, and can readily provide substantial quantities of purified water.

SUMMARY OF THE INVENTION

The present invention is directed to an apparatus and methods for the electrolytic treatment of liquids. The electrolytic cell of the present invention utilizes carbon electrodes to form a liquid treatment chamber through which liquid being electrolytically treated flows, and the carbon electrodes are provided with electrical distributors running the length of each electrode.

Accordingly, it is an object of the present invention to provide an electrolytic cell which can treat or purify liquid flowing between the electrodes of the electrolytic cell.

A further object of the present invention is to provide a method to electrolytically treat liquids flowing through an electrolytic cell to achieve purification and/or evaporation of the liquids.

Other and further objects and advantages of the present invention will be evident hereinafter.

DETAILED DESCRIPTION OF THE PREFERRED EMBODIMENT

Figure 1:
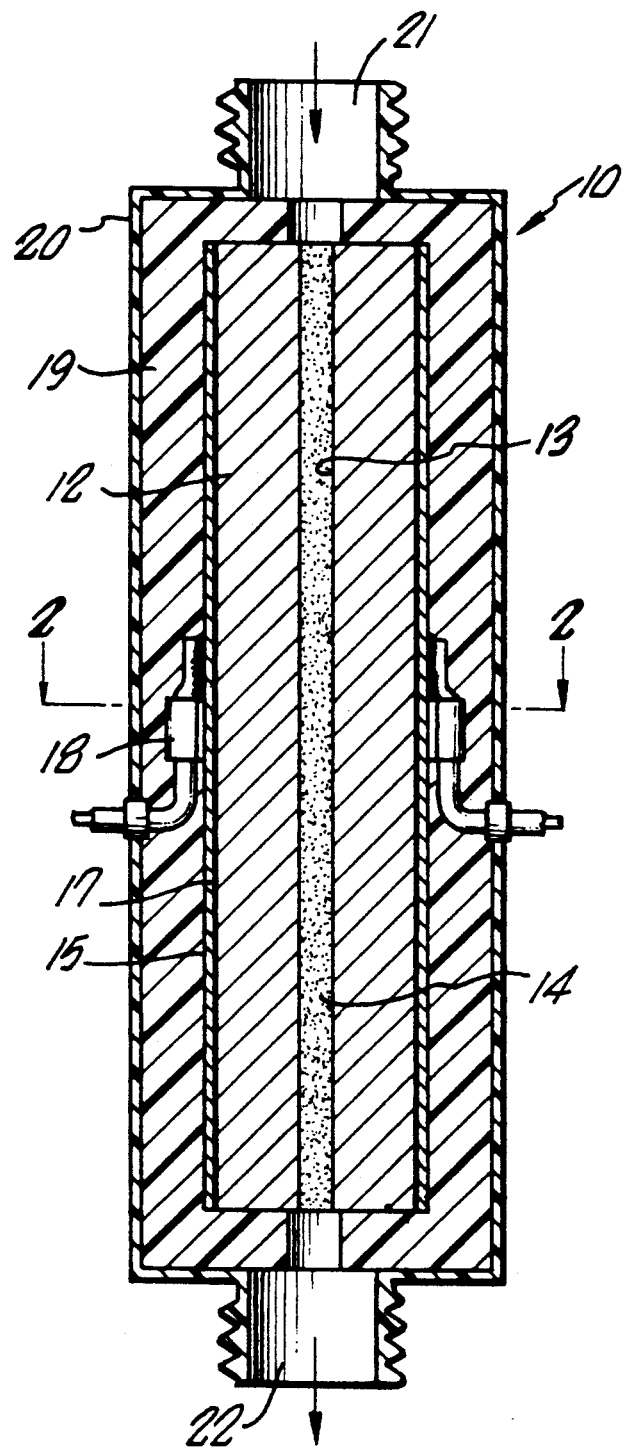
FIG. 1 shows a cut-away view of a preferred embodiment of the present electrolytic cell invention.
Figure 2:
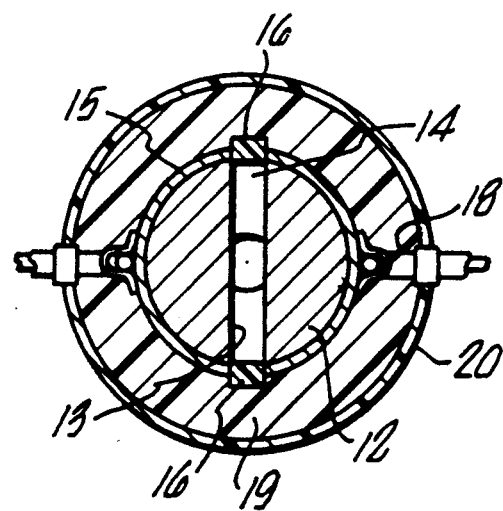
FIG. 2 shows a cross-sectional view of FIG. 1 taken along line 2—2.

Turning in detail to the drawings, FIG. 1 shows a diagrammatic view of an electrolytic cell 10 in accordance with present invention. In this embodiment, two carbon electrodes 12 are positioned parallel to each other to form a space for a fluid pathway between them, constituting a treatment chamber 14. The interior surfaces 13 of the electrodes form the majority of the surface area of the treatment chamber 14. The two electrodes are separated from each other at their edge by spacers 16 which complete the formation of the treatment chamber 14, position the electrodes 12 in relation to each other, and make a water-tight seal with the electrode surfaces. The spacers 16 are made of a non-conductive material, such as e.g. acrylic resins, epoxy resins, etc. The spacers firmly separate and electrically insulate the electrodes 12 from each other. The spacers 16 are secured directly to the interior edge surfaces of the electrodes 12.

Each electrode 12 is provided with an electrical distributor 15 along the length of the electrode. In the preferred embodiment, the electrical distributor 15 is a thin layer of copper or other highly electrically conductive material which is applied to the exterior surface 17 of each electrode 12. The electrical distributor 15 for one electrode 12 is isolated by the spacers 16 from the electrical distributor 15 of the other electrode, as well as from the other electrode 12 itself. Alternately, the electrical distributor 15 can be a rod or length of highly conductive material, such as copper, placed within each electrode 12 and running the length of each electrode. In such an embodiment, the electrode 12 itself isolates the electrical distributor 15. Electrical connectors 18 are provided to attach the electrodes 12 to an electric circuit and voltage source.

A core 19 of a non-conductive insulating material, such as e.g. ceramic, resin, glass, etc., surrounds and encloses the electrodes 12 and spacers 16 which form the treatment chamber 14, all of which are held and contained in a housing 20 forming the electrolytic cell of the present invention. Liquid enters the treatment chamber through the intake port 21, and treated fluid exits through the outlet port 22.

During operation of the electrolytic cell 10 of the preferred embodiment, a liquid, such as e.q., tap water, enters the electrolytic cell 10 through the intake port 21, fills and flows through the treatment chamber 14, and exits through the outlet port 22. As the liquid flows through the treatment chamber 14, the liquid closes the electric circuit and allows electric current to pass between the carbon electrodes 12 through the liquid flowing through the treatment chamber 14. The passage of electric current between the electrodes 12 and through the liquid as the liquid flows through the treatment chamber 14 causes microorganisms which may be present in the liquid to be killed, thereby purifying the liquid. The distance between the electrodes 12, the length of the treatment chamber 14, and amount and voltage of electric current supplied to the electrodes 12 and electrical distributors 15 through the electrical connectors 18 all can be varied and adjusted by those of skill in the art to achieve the desired flow rate of liquid through the treatment chamber 14 and at the same time the desired amount of liquid treatment or purification. Typical household current, e.g. 110 volt AC, can be utilized as the source of electric current. A voltage regulator can be provided a part of the electric circuit to protect against surges in electric current flow. Preferably, the elevation of the intake port 21 is lower than that of the outlet port 22 so that accumulation of any gas bubbles in the treatment chamber 14 is avoided.

Alternately, the electrolytic cell 10 of the present invention can be utilized as a liquid evaporization device by adjusting the liquid flow rate and supplying sufficient electric current so that the temperature of the liquid flowing through the electrolysis chamber 14 is raised to its boiling point. In this embodiment, separate vapor and liquid outlet ports are provided to facilitate separation of evaporated gases from any remaining liquid.

The intake port 21 Can be shaped or provided with fittings so that it can be attached, for example, to a standard water tap or a water hose for a continuous supply of water to be treated in the electrolysis cell 10. Alternately, a discrete volume or batch of water could be supplied to the intake port 21 for treatment.

The housing 20 of the electrolytic cell 10 can be attached to numerous types of support for ease of handling and use. For example, the electrolytic cell 10 could be contained in a pistol-shaped support which could be hand-held, and from which a hose or conduit extends for attachment to a source of water to be treated. As another example, the electrolytic cell 10 could be mounted in a support which would also contain a vessel into which a discrete volume of water to be treated is placed and directed to the intake part 21 of the electrolytic cell 10.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An electrolytic cell for treatment of liquid flowing through a treatment chamber, comprising:
    a housing;
    carbon electrodes secured within said housing, said carbon electrodes having interior and exterior surfaces and said carbon electrodes being positioned so that the interior surfaces of said carbon electrodes are parallel to each other;
    spacers secured along the interior surface edges of said carbon electrodes to complete formation of the treatment chamber through which the liquid to be treated can flow, said spacers being made of an electrically non-conductive material;
    an electrical distributor running the length of and in contact with each said carbon electrode; and
    connection means for supplying electrical current to said carbon electrodes.

2. The apparatus of claim 1 wherein said electrical distributors are positioned within said carbon electrodes.

3. An electrolytic cell for treatment of liquid flowing through a treatment chamber, comprising:
    a housing;
    carbon electrodes secured within said housing, said carbon electrodes having interior and exterior surfaces and said carbon electrodes being positioned so that the interior surfaces of said carbon electrodes are parallel to each other;
    spacers secured along the interior surface edges of said carbon electrodes to complete formation of the treatment chamber through which the liquid to be treated can flow, said spacers being made of an electrically non-conductive material;
    an electrical distributor running the length of each said carbon electrode; and
    connection means for supplying electrical current to said carbon electrodes, wherein said electrical distributors are made of copper.

4. An electrolytic cell for treatment of liquid flowing through a treatment chamber, comprising:
    a housing;
    carbon electrodes secured within said housing, said carbon electrodes having interior and exterior surfaces and said carbon electrodes being positioned so that the interior surfaces of said carbon electrodes are parallel to each other;
    spacers secured along the interior surface edges of said carbon electrodes to complete formation of the treatment chamber through which the liquid to be treated can flow, said spacers being made of an electrically non-conductive material;
    an electrical distributor running the length of each said carbon electrode; and
    connection means for supplying electrical current to said carbon electrodes, wherein said electrical distributors are secured to the exterior surfaces of said carbon electrodes.

* * * * *